(12) United States Patent
Todaka et al.

(10) Patent No.: US 12,299,337 B2
(45) Date of Patent: May 13, 2025

(54) PRINTING DEVICE COMMUNICATES WITH FIRST AND SECOND EXTERNAL DEVICES, TRANSMITS FIRST DRIVE SIGNAL TO THE FIRST EXTERNAL DEVICE WHILE CUTTING IS PERFORMED AND TRANSMITS SECOND DRIVE SIGNAL TO THE SECOND EXTERNAL DEVICE WHILE CUTTING IS NOT PERFORMED

(71) Applicant: SEIKO EPSON CORPORATION, Tokyo (JP)

(72) Inventors: Shingo Todaka, Matsumoto (JP); Ryota Kondo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/544,690

(22) Filed: Dec. 19, 2023

(65) Prior Publication Data

US 2024/0211186 A1 Jun. 27, 2024

(30) Foreign Application Priority Data

Dec. 21, 2022 (JP) ................................. 2022-204120

(51) Int. Cl.
*G06F 3/12* (2006.01)
*H04N 1/00* (2006.01)

(52) U.S. Cl.
CPC .......... *G06F 3/1236* (2013.01); *G06F 3/1204* (2013.01); *H04N 1/00403* (2013.01)

(58) Field of Classification Search
None
See application file for complete search history.

(56) References Cited

U.S. PATENT DOCUMENTS 8,635,323 B2 * 1/2014 Ohtani .................. G06F 9/5094
709/224
2011/0216346 A1 * 9/2011 Takamoto ................. G06F 3/12
358/1.14

(Continued)

FOREIGN PATENT DOCUMENTS

JP 2017-138811 A 8/2017

OTHER PUBLICATIONS

Machine Translation in English of JP Pub 2017-713881 to Takaya et al.*

(Continued)

*Primary Examiner* — Haris Sabah
(74) *Attorney, Agent, or Firm* — WORKMAN NYDEGGER

(57) ABSTRACT

A printing device includes a communication section configured to communicate with an external device, a connector configured to be coupled to one of a first peripheral device and a second peripheral device, a printing section that prints on a recording paper, and a control section that controls the printing section, and the control section transmits, when the communication section receives a first command, a drive instruction to the first peripheral device via the connector to drive the first peripheral device even while the printing section is printing, and transmits, when the communication section receives a second command, a drive signal to the second peripheral device via the connector to drive the second peripheral device while the printing section is not printing.

6 Claims, 6 Drawing Sheets

(56) References Cited

U.S. PATENT DOCUMENTS

| | | | |
|---|---|---|---|
| 2013/0242346 A1* | 9/2013 | Nakamichi | G06F 3/1241 |
| | | | 358/1.15 |
| 2014/0293336 A1* | 10/2014 | Endo | B41J 3/4075 |
| | | | 358/1.15 |
| 2016/0246554 A1* | 8/2016 | Yasuda | G06F 3/1292 |
| 2019/0196759 A1* | 6/2019 | Someya | G06F 3/1224 |

OTHER PUBLICATIONS

Machine Translation in English of JP Pub 2017-138811 to Takaya et. al.*

* cited by examiner

PRINTING DEVICE COMMUNICATES WITH FIRST AND SECOND EXTERNAL DEVICES, TRANSMITS FIRST DRIVE SIGNAL TO THE FIRST EXTERNAL DEVICE WHILE CUTTING IS PERFORMED AND TRANSMITS SECOND DRIVE SIGNAL TO THE SECOND EXTERNAL DEVICE WHILE CUTTING IS NOT PERFORMED

The present application is based on, and claims priority from JP Application Serial Number 2022-204120, filed Dec. 21, 2022, the disclosure of which is hereby incorporated by reference herein in its entirety.

BACKGROUND

1. Technical Field

The present disclosure relates to a printing device and a control method for a printing device.

2. Related Art

Printers that issue a slip and output a signal that instructs to open a drawer have been known.

However, in a printer described in JP-A-2017-138811, a power source is not taken into account, and there is a probability that an expensive large power source is needed.

SUMMARY

A printing device includes a communication section configured to communicate with an external device, a connector configured to be coupled to one of a first peripheral device and a second peripheral device, a printing section that prints on a recording paper, and a control section that controls the printing section, and the control section transmits, when the communication section receives a first command, a drive instruction to the first peripheral device via the connector to drive the first peripheral device even while the printing section is printing, and transmits, when the communication section receives a second command, a drive signal to the second peripheral device via the connector to drive the second peripheral device while the printing section is not printing.

A control method for a printing device that includes a communication section configured to communicate with an external device, a connector configured to be coupled to one of a first peripheral device and a second peripheral device, and a printing section that prints on a recording paper includes transmitting, when the communication section receives a first command, a drive instruction to the first peripheral device via the connector to drive the first peripheral device even while the printing section is printing, and transmitting, when the communication section receives a second command, a drive signal to the second peripheral device via the connector to drive the second peripheral device while the printing section is not printing.

DESCRIPTION OF EMBODIMENTS

Figure 1:
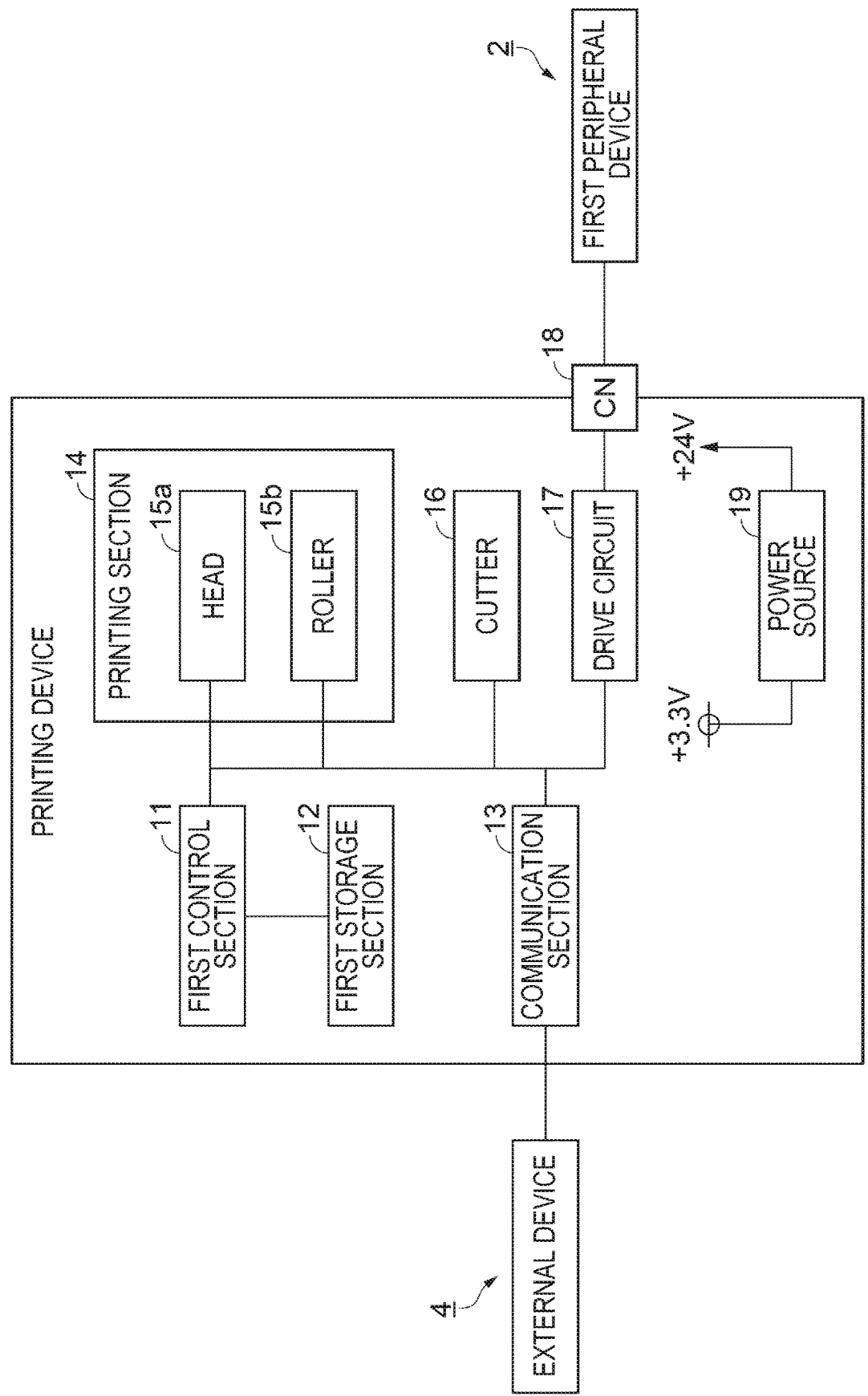
FIG. 1 is a block diagram illustrating a configuration of a printing device to which a first peripheral device is coupled.

1. Embodiment 1-1. Printing Device with First Peripheral Device Coupled Thereto As illustrated in FIG. 1, a printing device 1 includes a first control section 11, a first storage section 12, a communication section 13, a printing section 14, a cutter 16, a drive circuit 17, a connector CN 18, and a power source 19. Note that the connector CN 18 will be hereinafter referred to simply as CN 18.

The printing device 1 can be coupled to the first peripheral device 2 via the CN 18 and can communicate with an external device 4 via the communication section 13. The printing device 1 according to this embodiment is used, for example, in a point-of-sale (POS) system.

The first control section 11 includes a central processing unit (CPU) that comprehensively controls components of the printing device 1, a universal asynchronous receiver transmitter (UART) that manages input and output, a field programmable gate array (FPGA) that is a logic circuit, a programmable logic device (PLD), or the like. The CPU is also referred to as a processor.

The first storage section 12 includes a flash read only memory (ROM) and a hard disk drive (HDD) that are rewritable non-volatile memories, a random-access memory (RAM) that is a volatile memory, or the like.

The CPU of the first control section 11 reads a program, such as a firmware or the like, and setting information that are stored in the nonvolatile memory of the first storage section 12 and executes the program using the RAM of the first storage section 12 as a work area.

The printing section 14 includes a head 15a and a roller 15b. A recording paper is, for example, a long thermal paper. The head 15a is, for example, a line thermal head. The first control section 11 rotates the roller 15b to cause the roller 15b to convey the thermal paper and drives the head 15a to cause the head to print on the thermal paper.

The cutter 16 includes a movable cutting blade. The first control section 11 moves the cutting blade to cause the cutter 16 to cut the thermal paper. The printed and cut thermal paper is used to issue a receipt that is given to a customer in a store or a slip that instructs cooking in a cooking area of a restaurant.

Note that the first control section 11 can adjust a distance for moving the cutting blade of the cutter 16 with respect to a movable range of the cutting blade of the cutter 16. Thus, the first control section 11 can move the cutting blade sufficiently with respect to the movable range to perform so-called full cut in which the thermal paper is completely cut and separated. The first control section 11 can also move the cutting blade halfway with respect to the movable range to perform so-called partial cut in which the thermal paper is partially cut.

A completely cut receipt is in a form in which a staff can easily hand the receipt to a customer. On the other hand, a partially cut slip is continuous to the long thermal paper in part and thus does not fall from the printing device 1, so that, even when a cook does not take the slip, the slip does not fall to and scatter on a floor of the cooking area.

The communication section 13 includes a circuit, a substrate, or the like that can communicate with the external device 4, such as a computer, a tablet terminal, or the like. The communication section 13 may, for example, include a connector and be compatible with a universal serial bus (USB) of a wired serial communication method. Also, the communication section 13 may, for example, include an antenna and be compatible with Ethernet (registered trademark) (IEEE802.3) of a wireless network communication method.

As will be described later, when the first control section 11 receives print data via the communication section 13, the first control section 11 controls the head 15*a* and the roller 15*b* of the printing section 14 to print on the recording paper.

When the first control section 11 receives a cut command via the communication section 13, the first control section 11 controls the cutter 16 to cut the recording paper.

The CN 18 is, for example, a connector that is a modular jack with six poles, that is, a so-called RJ-11 connector. The CN 18 can be coupled to one of the first peripheral device 2 and a second peripheral device 3 that will be described later.

As will be described later, the drive circuit 17 can transmit and receive predetermined information or signal to the first peripheral device 2 via the CN 18. Similarly, the drive circuit 17 can do the same to the second peripheral device 3.

The first peripheral device 2 can receive supply of power from the printing device 1 via the CN 18 to operate. The same applies to the second peripheral device 3.

The power source 19 can generate voltages of, for example, about +24 V and about +3.3 V and output the voltages. Note that, in the following, +24V is simply referred to as 24V and +3.3V is simply referred to as 3.3V. In addition, when expressing current and voltage, "about" is omitted.

The power source 19 may be configured to be supplied with a DC voltage from outside by an AC adapter. Alternatively, the power source 19 may be configured to be supplied with an AC voltage of AC100 V or the like from the outside and convert the AC voltage to a DC voltage therein.

The power source 19 can supply 24 V to drive a so-called actuator, such as the printing section 14 including the head 15*a* and roller 15*b*, the cutter 16, the drive circuit 17, or the like. The power source 19 can also supply 3.3 V to a logic circuit, such as the first control section 11, the first storage section 12, the communication section 13, or the like. Furthermore, the power source 19 can supply 24V to the first peripheral device 2 and the second peripheral device 3 via the CN 18.

As a situation where a current consumption of the printing section 14 is particularly large, the printing section 14 consumes a current of about 1.8 A at 24 V, for example, when printing a graphic, such as a logo with high printing duty. Also, as a situation where a current consumption of the cutter 16 is particularly large, the cutter 16 consumes a current of about 1.0 A at 24 V, for example, when the cutter 16 starts cutting.

The power source 19 is configured to be capable of supplying a current with a margin of, for example, about 10% of the above-described current consumption when the printing section 14 prints, that is, when the current consumption is largest. In a manner described above, the power source 19 is configured to have a minimum necessary power capacity. The power source 19 has a power capacity of, for example, 2.0 A at 24 V. Since the logic circuit consumes a current of 0.08 A at 3.3 V, a margin of about 10% as described above is sufficient to supply the current.

As described above, as the power source 19, an inexpensive and small power source with a minimum necessary power capacity can be employed. As a result, the printing device 1 including the power source 19 can be made inexpensive and small. This makes it easier to introduce the printing device 1 into a store, a cooking area, or the like where a price and an installation location of the printing device 1 are limited.

In a case where the first peripheral device 2 is a sounding device, as will be described later, the first peripheral device 2 consumes, for example, a current of 0.03 A at 24V when executing sounding in which a current consumption is large. That is, comparison between examples of the current consumptions of the components indicates, at 24V, the printing section 14 (1.8 A)>the cutter 16 (1.0 A)>>the first peripheral device 2 (0.03 A).

The current consumption when the printing section 14 and the first peripheral device 2 are driven at the same time and the current consumption when the cutter 16 and the first peripheral device 2 are driven at the same time are 1.83 A and 1.03 A, respectively, at 24 V. The power source 19 has a power capacity of 2.0 A at 24 V. Therefore, the power source 19 can supply power to drive the printing section 14 and the first peripheral device 2 at the same time. The power source 19 can supply power to drive the cutter 16 and the first peripheral device 2 at the same time as well.

Note that the power source 19 cannot supply power to drive the printing section 14 and the cutter 16 at the same time. This is because the current consumption at this time is 2.8 A and exceeds the above-described supply capacity of the power source 19.

The first storage section 12 of the printing device 1 stores information related to in which combination the printing section 14, the cutter 16, and the first peripheral device 2 can be driven at the same time with respect to the supply capacity of the power source 19. The information is hereinafter referred to as combination information.

When the first control section 11 drives the printing section 14, the cutter 16, and the first peripheral device 2, the first control section 11 reads the combination information from the first storage section 12, determines which combination is possible, and operates each of the printing section 14, the cutter 16, and the first peripheral device 2, based on a possible combination of the printing section 14, the cutter 16, and the first peripheral device 2 that can be driven at the same time. The same applies to the second peripheral device 3 that will be described later.

Incidentally, in an example illustrated in FIG. 1, the printing device 1 is configured to issue a slip that instructs cooking in a cooking area. In this case, the first peripheral device 2 is, for example, preferably a sounding device that has a sounding function. The printing device 1 can cause the first peripheral device 2 to sound, that is, can drive the first peripheral device 2.

The sounding of the first peripheral device 2 can inform the cook that the printing device 1 has issued a slip. As described above, provided that a configuration in which the first peripheral device 2 is caused to sound using the printing device 1 that issues the slip is employed, the cook can easily notice that the printing device 1 has issued the slip and can immediately pick up the slip to start cooking.

Figure 2:
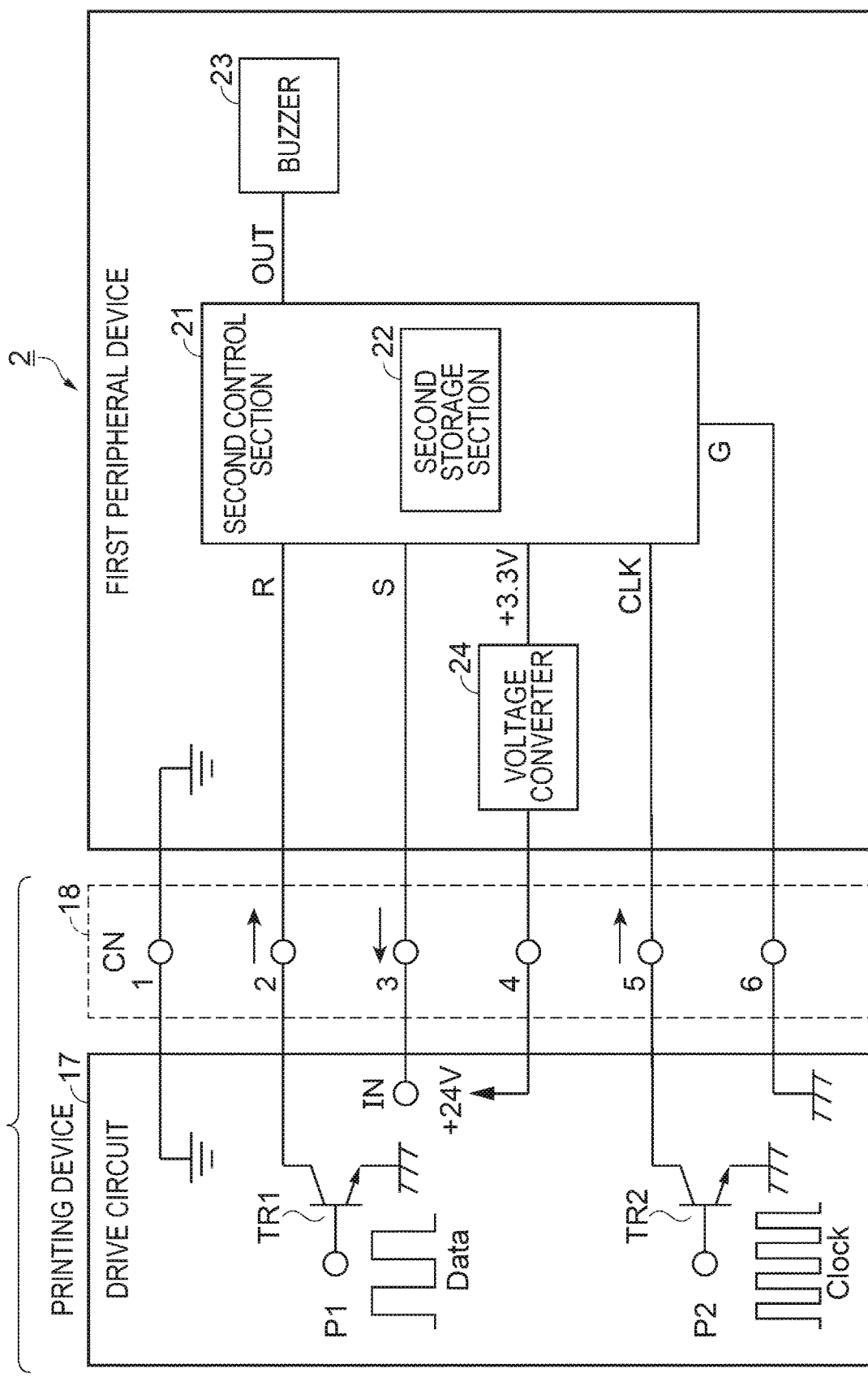
FIG. 2 is a circuit diagram illustrating major portions of the first peripheral device and the printing device when the first peripheral device is coupled to the printing device.

Next, with reference to FIG. 2, a configuration in which the printing device 1 drives the first peripheral device 2 will be described. Note that, for convenience of description, as for a side of the printing device 1, the drive circuit 17 and the CN 18 are mainly illustrated.

The printing device 1 is coupled to the first peripheral device 2 via the CN 18 by a modular cable or the like.

The first peripheral device 2 includes a second control section 21, a second storage section 22, a buzzer 23, and a voltage converter 24. Similar to the first control section 11, the second control section 21 includes a CPU or the like and, similar to the first storage section 12, the second storage section 22 includes a nonvolatile memory, a volatile memory, or the like.

Note that the second storage section 22 may be built in the second control section 21. The buzzer 23 may be built in the second control section 21.

The voltage converter 24 of the first peripheral device 2 can convert 24 V supplied from the printing device 1 to 3.3 V and supply 3.3 V to the second control section 21 that is a logic circuit, the second storage section 22, or the like.

Note that, in a configuration in which the buzzer 23 is driven by 3.3 V, the buzzer 23 is configured to receive supply of 3.3 V from the voltage converter 24. In a configuration in which the buzzer 23 is driven by 24 V, the buzzer 23 is configured to receive supply of 24 V from the printing device 1. When the second control section 21, the second storage section 22, or the like is also driven by 24 V, the voltage converter 24 may be omitted.

As described above, the first peripheral device 2 can receive supply of power from the printing device 1 to be driven.

The first control section 11 of the printing device 1 includes output ports P1 and P2 and an input port IN.

The second control section 21 of the first peripheral device 2 includes output ports OUT and S and input ports R and CLK. The second control section 21 can output a sounding signal from the output port OUT to the buzzer 23 to cause the buzzer 23 to sound.

The drive circuit 17 of the printing device 1 includes transistors TR1 and TR2. The transistors TR1 and TR2 can be driven using 24 V that is a voltage capable of driving the printing section 14 or the like.

A base of the transistor TR1 and a base of the transistor TR2 are coupled to the output ports P1 and P2 of the first control section 11, respectively. The first control section 11 outputs a Clock signal from the output port P2 and outputs predetermined information as a Data signal from output port P1 in synchronization with the Clock signal.

The Data signal and the Clock signal input to the base of the transistor TR1 and the base of the transistor TR2, respectively, are amplified using 24 V and transmitted from respective collectors to the first peripheral device 2 via the CN 18.

Note that the Data signal includes a drive instruction and, when the first peripheral device 2 is a sounding device, the Data signal includes a sounding instruction.

The CN 18 is a connector with six-pole terminals and the terminals are denoted by numbers 1 to 6.

A terminal 1 of the CN 18 couples respective earths of the printing device 1 and the first peripheral device 2 to cause potentials thereof to match each other.

A terminal 2 of the CN 18 transmits the amplified Data signal from the printing device 1 to the first peripheral device 2. At this time, a terminal 5 of the CN 18 transmits the amplified Clock signal in synchronization with the Data signal from the printing device 1 to the first peripheral device 2.

A terminal 3 of the CN 18 transmits a status signal from the output port S of the first peripheral device 2 to the printing device 1. The status signal is input to the input port IN of the first control section 11.

A terminal 4 of the CN 18 supplies 24 V from the printing device 1 to the first peripheral device 2. A terminal 6 of the CN 18 couples a ground of the printing device 1 and a ground port G of the second control section 21 of the first peripheral device 2 to cause respective potential thereof to match each other.

As described above, the terminal 4 of the CN 18 can supply 24V that is a voltage capable of driving the printing section 14, the cutter 16, or the like to the first peripheral device 2.

Also, each of the terminal 2 and the terminal 5 of the CN 18 can amplify a drive instruction as a corresponding one of the Data signal and the Clock signal using 24V by a corresponding one of the transistors TR1 and TR2 and transmit the corresponding one of the Data signal and the Clock signal to the first peripheral device 2.

Note that the transistors TR1 and TR2 may be configured to transmit the Data signal and the Clock signal to the first peripheral device 2 using 3.3 V.

The second control section 21 of the first peripheral device 2 receives the Data signal and the Clock signal transmitted from the printing device 1 from the input ports R and CLK. The second control section 21 can acquire a sounding instruction from the Data signal received from the input port R in accordance with a timing of the Clock signal received from the input port CLK. As described above, the printing device 1 and the first peripheral device 2 are capable of so-called serial communication in which communication is performed in synchronization with the Clock signal.

The second control section 21 can generate a sounding signal, based on the acquired sounding instruction, and output the sounding signal from the output port OUT to the buzzer 23 to cause the buzzer 23 to sound.

Note that the first peripheral device 2 may be configured to convert the Data signal and the Clock signal to 3.3 V using the voltage converter 24.

Figure 3:
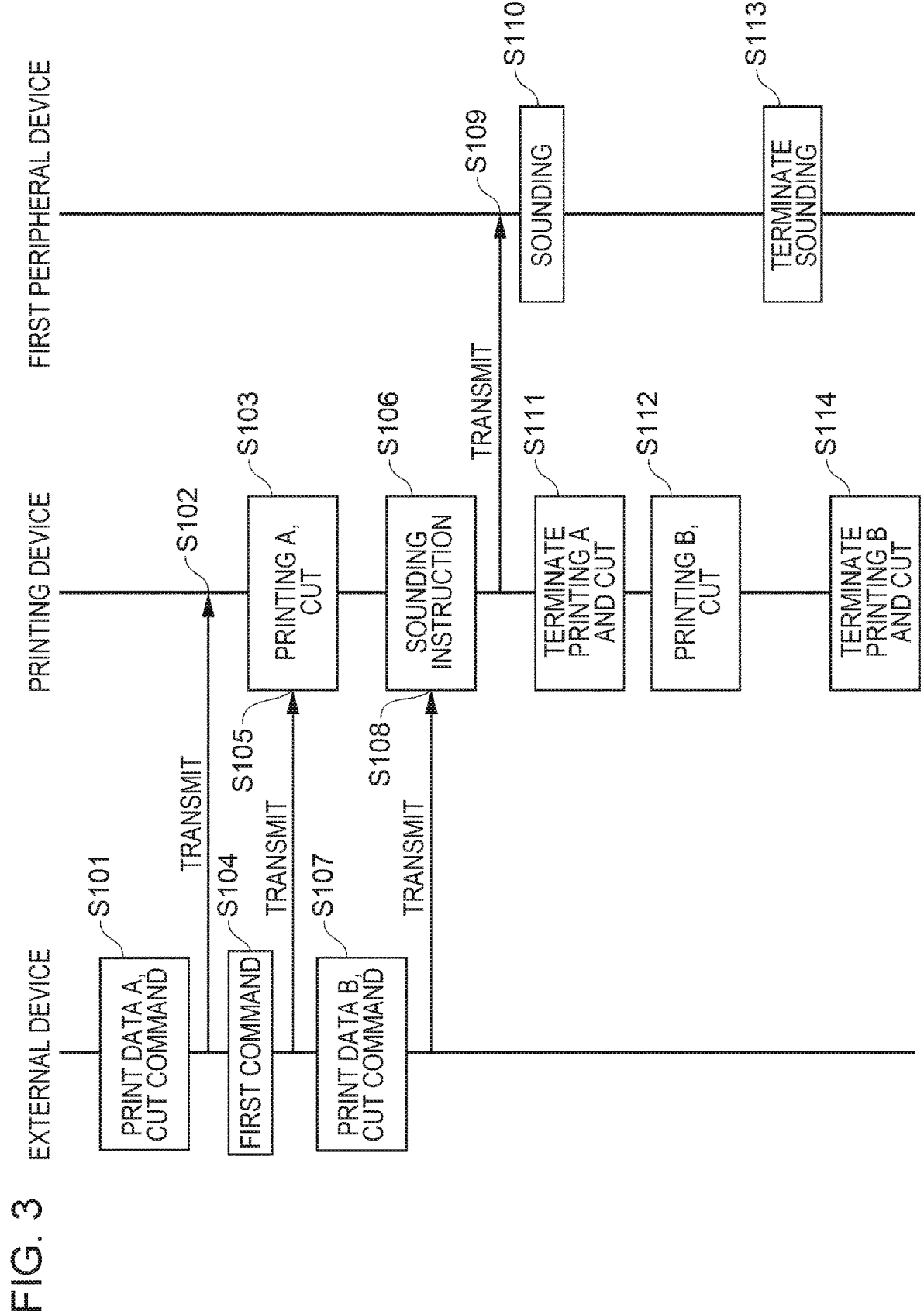
FIG. 3 is a state transition diagram illustrating a control method for a printing device when the first peripheral device is coupled to the printing device.

1-2. Control Method for Printing Device with First Peripheral Device Coupled Thereto Next, with reference to FIG. 3, a control method in which the printing device 1 drives the first peripheral device 2 will be described. The first peripheral device 2 is, for example, a sounding device.

First, the external device 4 generates print data A and a cut command and transmits the print data A and the cut command to the printing device 1 (S101). The printing device 1 receives the print data A and the cut command via the communication section 13 (S102).

The first control section 11 of the printing device 1 executes printing A to print the print data A on a recording paper by the printing section 14 and executes cutting of the recording paper by the cutter 16, based on the cut command (S103). Note that, for convenience of description, the cutting is hereinafter referred to as cut in accordance with the cut command.

Assume that, while the first control section 11 is executing one of the printing A and the cut (S103), the external device 4 generates a first command including information to instruct sounding that is driving of the first peripheral device 2 and transmits the first command to the printing device 1 (S104). The printing device 1 receives the first command via the communication section 13 (S105).

The first control section 11 can read the combination information from the first storage section 12 to determine that the printing section 14 and the first peripheral device 2 can be driven at the same time and determine the cutter 16 and the first peripheral device 2 can be driven at the same time.

The first control section 11 generates a sounding instruction, based on the received first command, and transmits the sounding instruction to the first peripheral device 2 via the CN 18 (S106), even executing one of the printing A and the cut (S103).

Specifically, as described above, the first control section 11 outputs, while outputting the Clock signal from the output port P2, the sounding instruction as the Data signal from the output port P1 in synchronization with the Clock signal.

The Data signal and the Clock signal are amplified by the transistors TR1 and TR2, respectively, and transmitted from the terminals 2 and 5 of the CN 18 to the first peripheral device 2.

The first peripheral device 2 receives the sounding instruction via the CN 18 (S109). Specifically, the second control section 21 of the first peripheral device 2 receives the Clock signal from the terminal 5 of the CN 18 via the input port CLK and receives the Data signal from the terminal 2 of the CN 18 via the input port R in synchronization with the Clock signal.

The second control section 21 acquires the sounding instruction, based on the received Data signal, generates a sounding signal from the output port OUT, and outputs the sounding signal to the buzzer 23 to thus cause the buzzer 23 to sound (S110).

Note that the second control section 21 of the first peripheral device 2 can transmit the status signal as information related to sounding of the buzzer 23 from the output port S to the printing device 1 via the terminal 3 of the CN 18.

The first control section 11 of the printing device 1 can determine a sounding state of the buzzer 23 of the first peripheral device 2, based on the status signal input to the input port IN.

Specifically, for example, the second control section 21 of the first peripheral device 2 transmits the status signal as a high-level voltage when the buzzer 23 is sounding, and a low-level voltage when the buzzer 23 is not sounding. For example, the high-level voltage is 3.3 V and the low-level voltage is a ground level.

The first control section 11 of the printing device 1 can determine when the received status signal is the high-level voltage that the first peripheral device 2 is causing the buzzer 23 to sound, and can determine when the received status signal is the low-level voltage that the buzzer 23 is not sounding. The first control section 11 can transmit the sounding instruction to the first peripheral device 2 when the buzzer 23 is not sounding.

Next, the external device 4 generates print data B and a cut command and transmits the print data B and the cut command to the printing device 1 (S107). The printing device 1 receives the print data B and the cut command via the communication section 13 (S108).

Assume that, at this time, the first control section 11 is executing one of the printing A and the cut (S103), and furthermore, has transmitted the sounding instruction to the first peripheral device 2 (S106), so that the first peripheral device 2 is sounding (S110).

The first control section 11 reads the combination information from the first storage section 12 and determines that the printing section 14 and the cutter 16 cannot be driven at the same time.

The first control section 11 is executing one of the printing A and the cut (S103), and therefore, the first control section 11 suspends the received print data B and cut command and does not execute the printing A and the cut and printing B and cut at the same time.

Note that, at this time, the second control section 21 of the first peripheral device 2 transmits the status signal to the printing device 1 when the buzzer 23 is sounding, and therefore, the first control section 11 of the printing device 1 can determine that the first peripheral device 2 is causing the buzzer 23 to sound.

The first control section 11 terminates execution of the printing A and the cut (S111). The first control section 11 executes the printing B in which printing on the recording paper is performed by the printing section 14, based on the suspended print data B, and subsequently, executes the cut of the recording paper by the cutter 16, based on the suspended cut command (S112).

Note that, at this time, the first peripheral device 2 is sounding (S110). In advance, the first control section 11 reads the combination information from the first storage section 12, determines that the printing section 14 and the first peripheral device 2 can be driven at the same time, and determines that the cutter 16 and the first peripheral device 2 can be driven at the same time.

Next, the first peripheral device 2 terminates sounding (S113). Then, the first control section 11 terminates execution of the printing B and the cut (S114).

As described above, the power source 19 of the printing device 1 can supply power to operate the printing section 14 and the first peripheral device 2 at the same time to the printing section 14 and the first peripheral device 2 and can supply power to operate the cutter 16 and the first peripheral device 2 at the same time to the cutter 16 and the first peripheral device 2.

Therefore, the first control section 11 of the printing device 1 can transmit the sounding instruction to the first peripheral device 2 and cause the first peripheral device 2 to sound (S110) even while executing one of the printing A and the cut (S103).

The first control section 11 can also transmit the sounding instruction to the first peripheral device 2 and execute one of the printing B and the cut (S112) even while the first peripheral device 2 is sounding (S110).

Note that, in the example described above, the external device 4 transmits both the print data A and the cut command to the printing device 1, and the printing device 1 executes the printing A and the cut. In this case, the external device 4 may transmit only one of the print data A and the cut command.

Also, the external device 4 transmits both the print data B and the cut command to the printing device 1, and the printing device 1 executes the printing B and the cut. In this case, the external device 4 may also transmit only one of the print data B and the cut command.

Now, a mode of the first command will be described. A first example of the first command is a mode where a waveform of the sound signal that causes the buzzer 23 of the first peripheral device 2 to sound is specified. Specifically, the first command includes information that specifies an ON time at which the buzzer 23 is caused to sound and an OFF time. In this case, the first command may include information that specifies a number of times the ON time and the OFF time are repeated.

Based on the first command, the first control section 11 of the printing device 1 generates waveforms related to the ON time at which the buzzer 23 is caused to sound and the OFF time as Data signals that are sound commands, and transmits the Data signals to the first peripheral device 2. In this case, the first control section 11 may not output the Clock signal.

The first peripheral device 2 can drive the buzzer 23 by directly turning the buzzer 23 ON or OFF with the waveforms that are the received Data signal to cause the buzzer 23 to sound. In this case, the second control section 21 of the first peripheral device 2 may not perform a process of generating the sounding signal. Furthermore, the first peripheral device 2 may not include the second control section 21.

Note that, in the first example of the first command, a mode where the OFF time is fixed and the OFF time is not included may be employed.

A second example of the first command is a mode where the first command includes musical scale information related to the sounding of the buzzer 23 of the first peripheral device 2 and time information related to the sounding.

Based on the first command, the first control section 11 of the printing device 1 generates the musical scale information and the time information as a Data signal that is a sounding instruction and transmits the Data signal to the first peripheral device 2 in synchronization with the Clock signal.

In this case, the second storage section 22 of the first peripheral device 2 stores in advance information of the drive signal corresponding to the musical scale information related to sounding of the buzzer 23. Based on the received sounding instruction, the second control section 21 can read the information of the drive signal corresponding to the specified musical scale information from the second storage section 22 to generate the drive signal, and cause the buzzer 23 to sound in accordance with a period of the specified time information.

In the second example of the first command, as compared to the first example of the first command, the first control section 11 of the printing device 1 does not need to generate complex waveform information in order to cause the buzzer 23 to sound. Furthermore, the first control section 11 does not need to continue transmitting the sounding instruction while the buzzer 23 is sounding. The first control section 11 can immediately terminate the process related to sounding and execute a next process.

A third example of the first command is a mode where the first command includes melody information related to sounding of the buzzer 23 of the first peripheral device 2. For example, the melody information includes information specifying a melody.

The first control section 11 of the printing device 1 generates the melody information as a Data signal that is a sounding instruction, based on the first command, and transmits the Data signal to the first peripheral device 2 in synchronization with the Clock signal.

In this case, the second storage section 22 of the first peripheral device 2 stores in advance detailed information, such as a series of the musical scales that are caused to sound as a melody specified by the buzzer 23, a time, or the like, corresponding to the melody information.

Based on the received sounding instruction, the second control section 21 can read the detailed information corresponding to the specified melody from the second storage section 22, generate a drive signal, and cause the buzzer 23 to sound.

In the third example of the first command, as compared to the first example of the first command, the first control section 11 of the printing device 1 does not need to generate complex waveform information in order to cause the buzzer 23 to sound. Furthermore, the first control section 11 does not need to continue transmitting the sounding instruction while the buzzer 23 is sounding. The first control section 11 can immediately terminate the process related to sounding and execute a next process.

In the second example of the first command, when the first control section 11 of the printing device 1 causes the buzzer 23 to sound a melody, the first control section 11 of the printing device 1 needs to generate information specifying a series of musical scales and a length for the melody and transmit the information to the first peripheral device 2.

In the third example of the first command, the first control section 11 may only specify the melody and does not need to transmit information on a series of musical scales and a time for the melody. The first control section 11 can immediately terminate the process related to the sounding and execute a next process.

1-3. Printing Device with Second Peripheral Device Coupled Thereto

A POS system includes a second peripheral device 3 that is a drawer in which money or the like is stored, that is, a cash drawer, in some cases.

Figure 4:
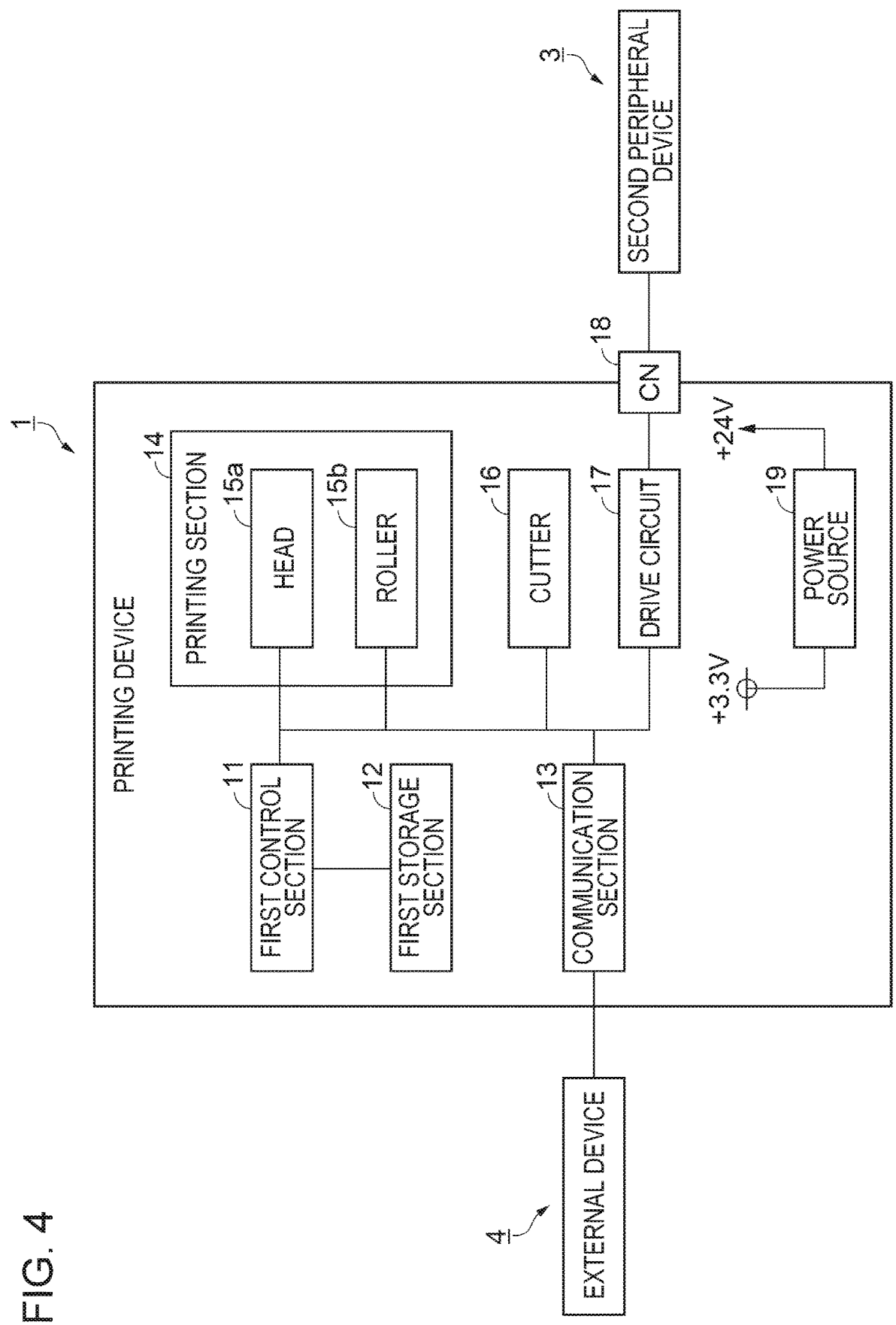
FIG. 4 is a block diagram illustrating a configuration of the printing device when a second peripheral device is coupled to the printing device.

As illustrated in FIG. 4, the printing device 1 can be coupled to the second peripheral device 3 via the CN 18 and can communicate with the external device 4 via the communication section 13. Note that the configuration of the printing device 1 is the same as that described above, and therefore, the description thereof will be omitted.

Figure 5:
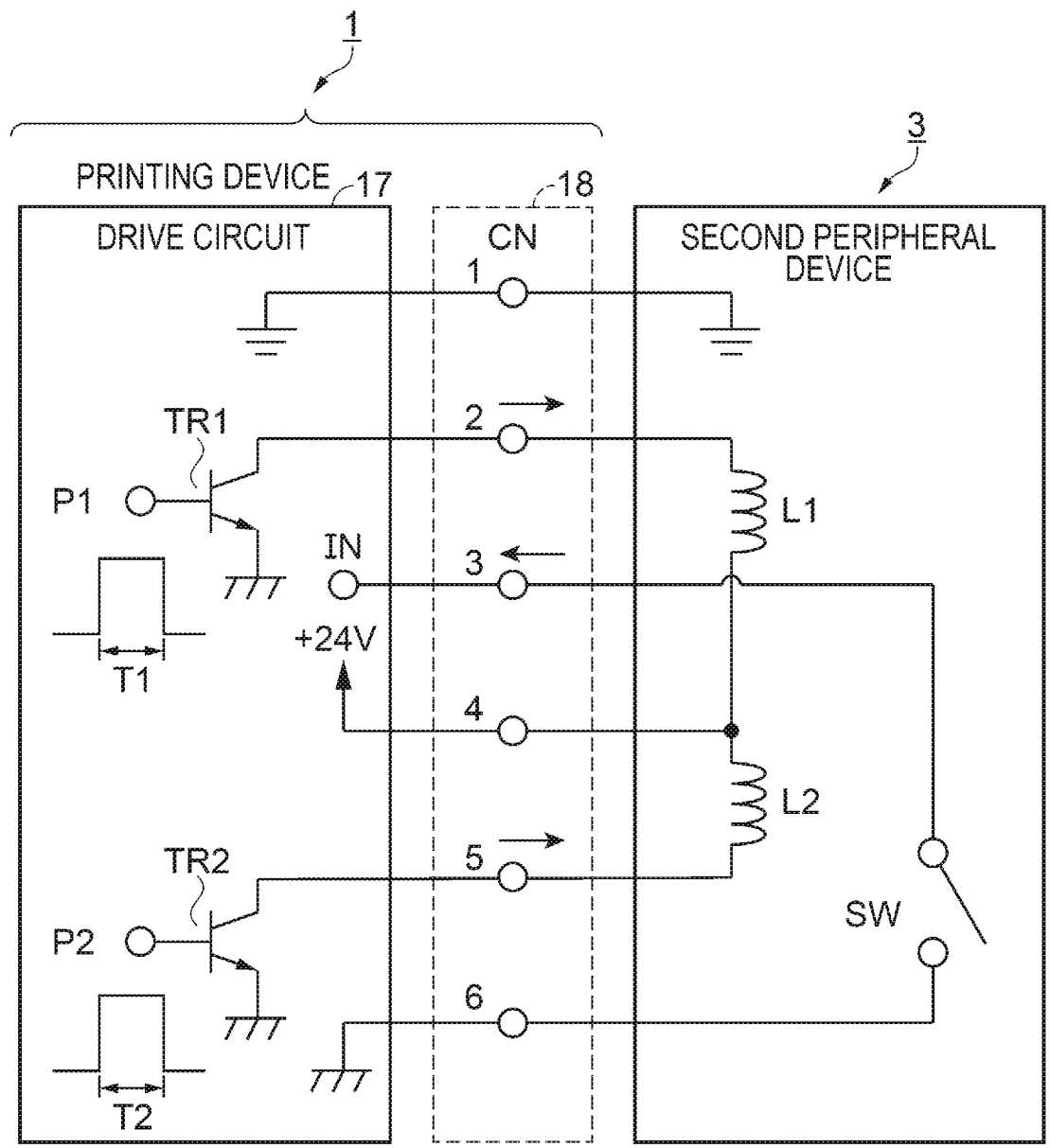
FIG. 5 is a circuit diagram illustrating major portions of the second peripheral device and the printing device when the second peripheral device is coupled to the printing device.

With reference to FIG. 5, a configuration in which the printing device 1 drives the second peripheral device 3 will be described. The printing device 1 is coupled to the second peripheral device 3 via the CN 18 by a modular cable or the like.

The second peripheral device 3 includes a drawer (not illustrated), plungers L1 and L2, a hook (not illustrated), a spring (not illustrated), and a switch SW. Each of the plungers L1 and L2 is an actuator including an electromagnet and is coupled to the hook. The drawer is locked by the hook when the drawer is closed. The drawer is configured to be locked by the hook when the staff pushes the drawer to close the drawer. At this time, the spring is compressed by the closed drawer.

The second peripheral device 3 is configured such that, when the plungers L1 and L2 of the second peripheral device 3 are driven, the hook locking the corresponding drawer is released and the drawer is opened by a force generated by expansion of the spring. Note that, in the following, driving the plungers L1 and L2 is also referred to as driving the second peripheral device 3.

Incidentally, in a store, two staffs use and mange respective individual drawers in the same second peripheral device 3 in some cases. Therefore, in this example, the second peripheral device 3 includes two drawers and the plungers L1 and L2 such that each of the plungers L1 and L2 corresponds to a corresponding one of the drawers.

In order to drive the plungers L1 and L2, for example, it is necessary to apply power of about 1 A at 24 V. The power source 19 of the printing device 1 has enough power to drive the plungers L1 and L2. Therefore, in the POS system, the second peripheral device 3 is coupled to the printing device 1.

Since the second peripheral device 3 is arranged near the printing device 1, the staffs in the store can hand receipts issued by the printing device 1 to customers and open and close the drawers of the second peripheral device 3 to give and receive cash to and from the customers.

The first control section 11 of the printing device 1 outputs drive signals T1 and T2 to drive the plungers L1 and L2 from the output ports P1 and P2. The drive signals T1 and T2 are signals having high-level voltage periods T1 and T2, respectively. Note that the first control section 11 does not output the drive signals T1 and T2 at the same time but outputs one of the drive signals T1 and T2. The periods T1 and T2 are, for example, 100 msec to 200 msec.

The drive signals T1 and T2 output from the first control section 11 are amplified by the transistors TR1 and TR2 using 24 V, respectively, and transmitted from the respective collectors to the second peripheral device 3 via the terminals 2 and 5 of the CN 18, respectively.

Each of the terminals 2 and 5 of the CN 18 is coupled to one end of a corresponding one of the plungers L1 and L2. The other end of each of the plungers L1 and L2 is coupled to the terminal 4 of the CN 18, and 24 V is supplied thereto from the printing device 1.

The plungers L1 and L2 are driven by the drive signals T1 and T2 and thus can open the corresponding drawers. At this time, for example, a current of 1 A at 24 V is caused to flow in the plungers L1 and L2 for a period of 100 msec to 200 msec.

Note that the terminal 1 of the CN 18 couples the respective earths of the printing device 1 and the second peripheral device 3 to cause respective potentials thereof to match each other.

As described above, the terminal 4 of the CN 18 can supply 24 V that is a voltage capable of driving the printing section 14 and the cutter 16 to the second peripheral device 3.

Also, the terminals 2 and 5 of the CN 18 can amplify the drive signals T1 and T2 using 24V by the transistors TR1 and TR2, respectively, and transmit the amplified drive signals T1 and T2 to the second peripheral device 3.

The switch SW is configured to be opened when one of the two drawers is opened and be closed when both the two drawers are closed.

One end of the switch SW is coupled to a ground level of the printing system 1 via the terminal 6 of the CN 18. The other end of the switch SW is coupled to the input port IN of the first control section 11 of the printing device 1 via the terminal 3 of the CN 18.

The input port IN is pulled up to 3.3 V. Therefore, when the input port IN detects 3.3 V that is a high-level voltage, the first control section 11 can determine that the switch SW is opened. That is, the first control section 11 can determine that one of the two drawers is opened.

On the other hand, when the input port IN detects the ground level that is the low-level voltage, the first control section 11 can determine that the switch SW is closed. That is, the first control section 11 can determine that both the two drawers are closed.

Figure 6:
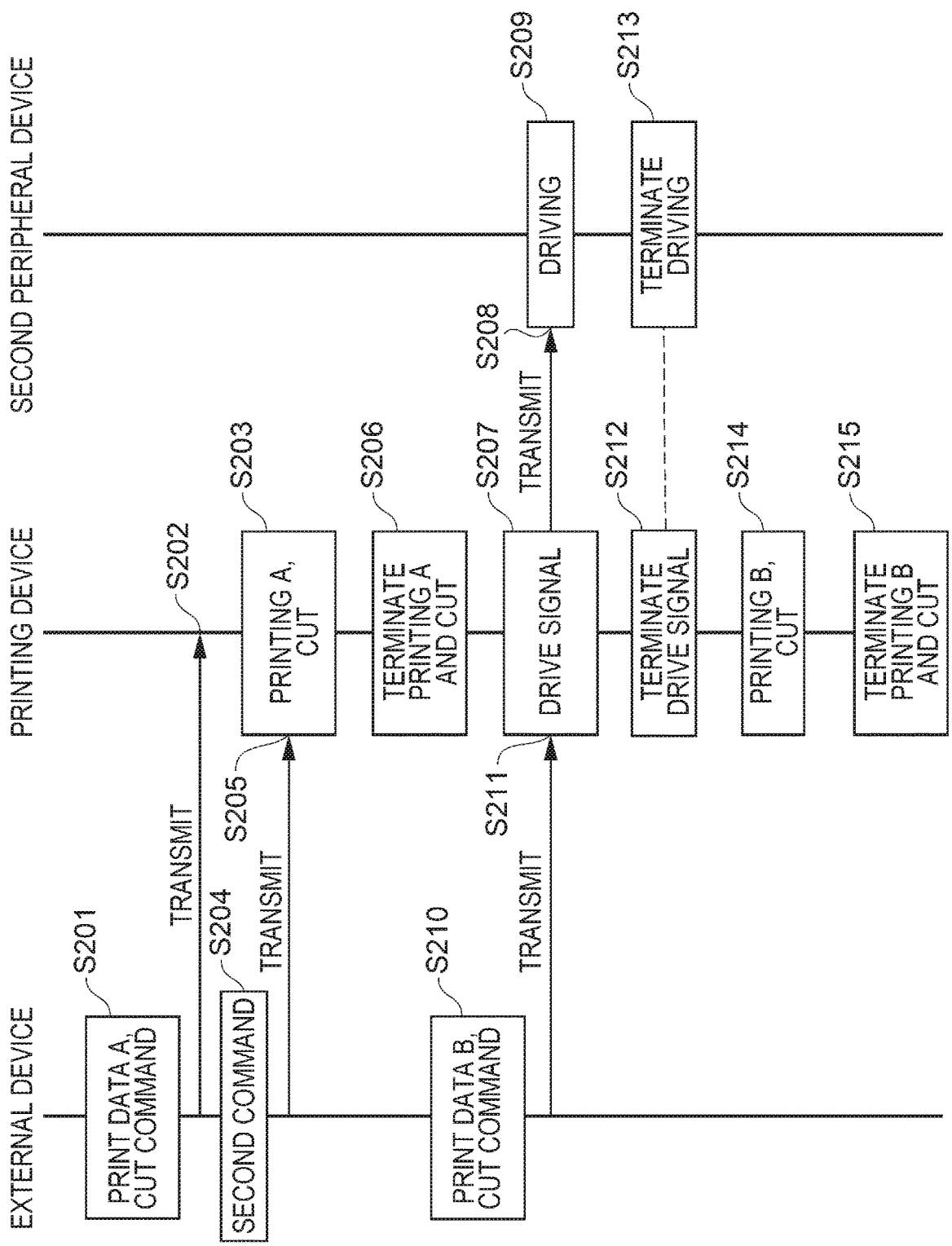
FIG. 6 is a state transition diagram illustrating a control method for a printing device when the second peripheral device is coupled to the printing device.

1-4. Control Method for Printing Device with Second Peripheral Device Coupled Thereto Next, with reference to FIG. 6, a control method in which the printing device 1 drives the second peripheral device 3 will be described.

First, the external device 4 generates print data A and a cut command and transmits the print data A and the cut command to the printing device 1 (S201). The printing device 1 receives the print data A and the cut command via the communication section 13 (S202).

The first control section 11 of the printing device 1 executes printing A to print the print data A on the recording paper by the printing section 14 and executes cut of the recording paper by the cutter 16, based on the cut command (S203).

Assume that, while the first control section 11 is executing one of the printing A and the cut (S203), the external device 4 generates a second command including information to instruct driving of the second peripheral device 3 and transmits the second command to the printing device 1 (S204). The printing device 1 receives the second command via the communication section 13 (S205).

Since the first control section 11 is executing one of the printing A and the cut (S203), the received second command is suspended and not immediately executed.

Note that, as will be described later, since the second command includes information that specifies one of the plungers L1 and L2 of the second peripheral device 3, the first control section 11 does not generate both the drive signal T1 and the drive signal T2 and transmit both the drive signal T1 and the drive signal T2 to the second peripheral device 3.

Incidentally, as described above, the current consumption when the printing section 14 is operated and the current consumption when the cutter 16 is operated are 1.8 A and 1.0 A, respectively. The current consumption when the second peripheral device 3 is driven is 1.0 A at 24 V. The values are the current consumption when one of the plunger L1 and the plunger L2 of the second peripheral device 3 is driven. Assume a case where both the plungers L1 and L2 are driven. In the case, the current consumption is equal to or larger than 2.0 A that can be supplied by the power source 19, and the power source 19 cannot supply power. Also, in actual use and as in the configuration of the second command above, both the plungers L1 and L2 are not driven.

Since the power source 19 has a power capacity of 2.0 A at 24 V, the power source 19 cannot supply power to operate the printing section 14 and the second peripheral device 3 at the same time. The power source 19 cannot supply power to operate the cutter 16 and the second peripheral device 3 at the same time as well. This is because the current consumption of the former is 2.8 A and that of the latter is 2.0 A, which is equal to or larger than 2.0 A that can be supplied by the power source 19.

Similar to a case in which the first peripheral device 2 is driven, the first storage section 12 of the printing device 1 stores combination information related to which combination among combinations of the printing section 14, the cutter 16, and the second peripheral device 3 can be driven at the same time with respect to the supply capacity of the power source 19.

When the first control section 11 drives the printing section 14, the cutter 16, and the second peripheral device 3, the first control section 11 reads the combination information from the first storage section 12 to determine which combination can be driven at the same time and operates each of ones of the printing section 14, the cutter 16, and the second peripheral device 3 in the combination, based on the combination that can be driven at the same time.

In this case, the first control section 11 can read the combination information from the first storage section 12 and determine that the printing section 14 and the second peripheral device 3 cannot be driven at the same time, and can determine that the cutter 16 and the second peripheral device 3 cannot be driven at the same time.

Therefore, while executing one of the printing A and the cut (S203), the first control section 11 does not execute driving the second peripheral device 3 even when the first control section 11 receives the second command. The first control section 11 waits until the printing A and the cut are completed.

The first control section 11 terminates execution of the printing A and the cut (S206). The first control section 11 generates the drive signal T1 or the drive signal T2, based on the suspended second command, and transmits the drive signal T1 or the drive signal T2 to the second peripheral device 3 (S207).

The second peripheral device 3 receives the drive signal T1 or the drive signal T2 (S208) and drives the corresponding one of the plunger L1 and the plunger L2 (S209) to open the corresponding drawer. Note that, on receiving the drive signal T1 or the drive signal T2, the corresponding plunger L1 or plunger L2 is driven.

As described above, when the printing section 14 and the cutter 16 are not executing the printing A and the cut, the first control section 11 transmits the drive signal T1 or the drive signal T2 to the second peripheral device 3 to drive the second peripheral device 3.

Next, assume that, while the first control section 11 is transmitting the drive signal T1 or the drive signal T2 (S207) and driving the second peripheral device 3 (S209), the external device 4 generates print data B and a cut command to transmits the print data B and the cut command to the printing device 1 (S210). The printing device 1 receives the print data B and the cut command via the communication section 13 (S211).

As described above, the power source 19 cannot supply power to drive the printing section 14 and the second peripheral device 3 at the same time. The power source 19 cannot supply power to drive the cutter 16 and the second peripheral device 3 at the same time as well.

The first control section 11 reads the combination information from the first storage section 12, determines that the printing section 14 and the second peripheral device 3 cannot be driven at the same time, and determines that the cutter 16 and the second peripheral device 3 cannot be driven at the same time.

Therefore, while driving the second peripheral device 3 (S209), the first control section 11 suspends the print data B and the cut command and does not immediately execute the print data B and the cut command even when the first control section 11 receives the print data B and the cut command.

That is, while driving the second peripheral device 3 (S209), the first control section 11 does not execute printing B and cut even when the first control section 11 receives the print data B and the cut command. The first control section 11 waits until transmission of the drive signal T1 or the drive signal T2 is completed.

Transmission of the drive signal T1 or the drive signal T2 is terminated (S212), and driving of the second peripheral device 3 is terminated (S213). Note that the transmission of the drive signal T1 or the drive signal T2 and the driving of the second peripheral device 3 are terminated at the same time.

Thereafter, the first control section 11 executes the printing B in which printing on the recording paper is performed by the printing section 14, based on the suspended print data B, subsequently executes cut of the recording paper by the cutter 16, based on the suspended cut command (S214), and the process ends (S215).

Note that, in the above-described example, the external device 4 transmits both the print data A and the cut command to the printing device 1, and the printing device 1 executes printing A and cut. In this case, the external device 4 may transmit only one of the print data A and the cut command.

Also, the external device 4 transmits both the print data B and the cut command to the printing device 1, and the printing device 1 executes the printing B and the cut. Also in this case, the external device 4 may transmit only one of the print data B and the cut command.

Now, the second command will be described. An example of the second command is a mode where a waveform of a drive signal that drives the second peripheral device 3 is specified. Specifically, the second command includes information specifying one of the plungers L1 and L2 of the second peripheral device 3 and information specifying the ON time at which the specified one of the plungers L1 and L2 is driven.

Based on the received second command, the first control section 11 of the printing device 1 generates the drive signal T1 or the drive signal T2 that corresponds to the specified ON time and outputs the generated drive signal T1 or T2 from one of the output ports P1 and P2 corresponding to a corresponding one of the specified plungers L1 and L2. The drive signal T1 or the drive signal T2 is amplified by the corresponding transistor TR1 or the transistor TR2 using 24V and transmitted to the second peripheral device 3 to drive the corresponding plunger L1 or L2.

According to the above-described embodiment, when the communication section 13 receives the first command, the printing device 1 can transmit a drive instruction to the first peripheral device 2 via the CN 18 to drive the first peripheral device 2 even while the printing section 14 is printing. When the communication section 13 receives the second command, the printing device 1 can transmit a drive signal to the second peripheral device 3 via the CN 18 to drive the second peripheral device 3 while the printing section 14 is not printing.

When the communication section 13 receives the first command, the printing device 1 can transmit a drive instruction to the first peripheral device 2 via the CN 18 to drive the first peripheral device 2 even while the cutter 16 is cutting. When the communication section 13 receives the second command, the printing device 1 can transmit a drive signal to the second peripheral device 3 via the CN 18 to drive the second peripheral device 3 while the cutter 16 is not cutting.

With the above-described configuration, the power source 19 of the printing device 1 can be made an inexpensive and small power source having a minimum necessary power capacity. The printing device 1 including the power source 19 can be also made inexpensive and small.

Although this embodiment has been described in detail above with reference to the drawings, the specific configuration is not limited to the embodiment and any change, replacement, deletion, or the like may be made to the embodiment without departing from the gist of the present disclosure.

The head 15a has been described using the line thermal head as an example, but any printing system is acceptable. For example, an ink jet head may be used.

The first peripheral device 2 may be configured to sound the buzzer 23 in a self-excited manner or in a separately-excited manner.

The first peripheral device 2 has been described using the sounding device as an example, but may be also a display device. The second peripheral device 3 has been described using the cash drawer as an example, but may be a change machine.

What is claimed is:

1. A printing device comprising:
   a communication section configured to communicate with an external device;
   a connector configured to be coupled to one of a first peripheral device that is external to the printing device and a second peripheral device that is external to the printing device;
   a printing section that prints on a recording paper;
   a cutter that cuts the recording paper; and
   a control section that controls the printing section and the cutter,
   wherein
   the control section
   transmits, when the communication section receives a first command, a drive instruction to the first peripheral device via the connector to drive the first peripheral device even while the printing section is printing,
   transmits, when the communication section receives a second command, a drive signal to the second peripheral device via the connector to drive the second peripheral device while the printing section is not printing,
   transmits, when the communication section receives the first command, the drive instruction to the first peripheral device via the connector to drive the first peripheral device even while the cutter is cutting, and
   transmits, when the communication section receives the second command, the drive signal to the second peripheral device via the connector to drive the second peripheral device while the cutter is not cutting.

2. The printing device according to claim 1,
   wherein
   the first peripheral device is a sounding device, and
   the drive instruction includes musical scale information and time information that are related to sounding.

3. The printing device according to claim 1,
   wherein
   the first peripheral device is a sounding device, and
   the drive instruction includes melody information related to sounding.

4. The printing device according to claim 1,
   wherein
   the second peripheral device is a cash drawer.

5. The printing device according to claim 1,
   wherein
   the connector is configured to
   supply a voltage that drives the printing section to the coupled first peripheral device or second peripheral device, and
   transmit the drive instruction or the drive signal using the voltage.

6. A control method for a printing device that includes a communication section configured to communicate with an external device, a connector configured to be coupled to one of a first peripheral device that is external to the printing device and a second peripheral device that is external to the printing device, a printing section that prints on a recording paper, and a cutter that cuts the recording paper, the control method comprising:
   transmitting, when the communication section receives a first command, a drive instruction to the first peripheral device via the connector to drive the first peripheral device even while the printing section is printing, and
   transmitting, when the communication section receives a second command, a drive signal to the second peripheral device via the connector to drive the second peripheral device while the printing section is not printing,
   wherein
   when the communication section receives the first command, the drive instruction is transmitted to the first peripheral device via the connector to drive the first peripheral device even while the cutter is cutting, and
   when the communication section receives the second command, the drive signal is transmitted to the second peripheral device via the connector to drive the second peripheral device while the cutter is not cutting.

* * * * *